United States Patent
Behl et al.

(10) Patent No.: US 6,628,518 B2
(45) Date of Patent: *Sep. 30, 2003

(54) MEMORY STORAGE DEVICE RACK HAVING VENTED RAILS

(75) Inventors: Sunny Behl, San Jose, CA (US); Chris Erwin, Fremont, CA (US)

(73) Assignee: InClose Design, Inc., San Jose, CA (US)

(*) Notice: Subject to any disclaimer, the term of this patent is extended or adjusted under 35 U.S.C. 154(b) by 94 days.

This patent is subject to a terminal disclaimer.

(21) Appl. No.: 09/780,992

(22) Filed: Feb. 8, 2001

(65) Prior Publication Data

US 2001/0048590 A1 Dec. 6, 2001

Related U.S. Application Data

(63) Continuation-in-part of application No. 09/298,139, filed on Apr. 23, 1999.

(51) Int. Cl.[7] .................................................. G06F 1/16
(52) U.S. Cl. ........................ 361/687; 361/685; 361/695; 312/223.1; 312/223.2; 454/184
(58) Field of Search ............................... 361/683, 681, 361/685, 686, 692, 695, 724–739, 749, 253, 759, 785, 788, 798, 801; 364/708.1; 312/223.1, 223.2, 111, 204, 265.6, 332.1; 454/184

(56) References Cited

U.S. PATENT DOCUMENTS

| 4,918,572 | A | | 4/1990 | Tarver et al. |
| 5,171,183 | A | * | 12/1992 | Pollard et al. .............. 454/184 |
| 5,260,851 | A | | 11/1993 | Chiou |
| 5,587,881 | A | | 12/1996 | Wang |
| 5,604,662 | A | * | 2/1997 | Anderson et al. ........... 361/685 |
| 5,694,290 | A | * | 12/1997 | Chang ......................... 361/685 |
| 5,765,933 | A | | 6/1998 | Paul et al. |
| 6,011,687 | A | * | 1/2000 | Gluskoter et al. .......... 361/686 |
| 6,069,792 | A | * | 5/2000 | Nelik .......................... 361/687 |
| 6,193,339 | B1 | * | 2/2001 | Behl et al. ................. 312/223.1 |

FOREIGN PATENT DOCUMENTS

| DE | 10007458 A1 | 2/2000 | .......... G11B/33/14 |

* cited by examiner

Primary Examiner—Michael Datskovsky
(74) Attorney, Agent, or Firm—James D. Ivey

(57) ABSTRACT

A rack for receiving a memory storage device carrier having a periphery to blow air through the opening. The rack has a backplane, a first lateral rail and a second lateral rail for mounting a memory storage device extending perpendicularly from the backplane. At least one rail has a periphery defining an opening with a fan mounted with respect to the opening to blow air through the opening.

29 Claims, 5 Drawing Sheets

FIG.—1
(PRIOR ART)

MEMORY STORAGE DEVICE RACK HAVING VENTED RAILS

CROSS-REFERENCE TO RELATED APPLICATIONS

This application is a continuation-in-part of U.S. application Ser. No. 09/298,139, filed Apr. 23, 1999, which is incorporated herein by reference in its entirety.

FIELD OF THE INVENTION

The present invention pertains to housings for holding a memory storage device and particularly to racks that removably hold hard disk drives and the like.

BACKGROUND OF THE INVENTION

Docking adapters removably interconnect memory storage devices to computer systems and to memory storage device systems, for example. Docking adapters can provide many advantages over fixed hardware including improved of data between non-integrated networks and systems. Docking adapters can also enable multiple users, each with a dockable hard drive, to use a single machine without interfering with operating settings and data of another.

U.S. Pat. No. Re. 34,369 to Darden et al., the disclosure of which is incorporated herein by reference, discloses a docking adapter for a hard disk drive. The docking adapter includes a carrier for holding a hard drive and a rack that mounts in a computer housing. The carrier has an open top. One drawback of the open top design is that when the carrier is removed from the rack, the hard disk drive is exposed. Exposing the hard disk drive may lead to damage to the hard drive, connective cabling, or other components during handling and transport.

Docking adapters that enclose hard disk drives are prone to heat buildup. When a hard drive operates and generates heat in a docking adapter, the docking adapter may inhibit airflow, which would otherwise cool the hard drive.

FIG. 1 shows a known docking adapter 10. The docking adapter 10 has a rack 12 and a carrier 14. The carrier 14 has a top cover 16 with vents that help cool a hard disk drive. Unfortunately, vents are not always effective at cooling an enclosed hard disk drive. When the docking adapter mounts in a crowded computer housing, for example, there may be insufficient space above the docking adapter to facilitate enough airflow through the vents to effectively cool a hard drive.

The rack 12 includes a backplane 18 having a connector and a rear-mounted fan. The carrier 14 has a backplane 20 with a connector that couples to the backplane connector of the rack. When the carrier inserts into the rack and the backplane 18 and 20 meet, there is little room for air to flow out from the carrier. The backplane of the carrier interferes with the outflow of air from the carrier. Accordingly, what is desired is a better way of providing airflow through a docking adapter.

SUMMARY OF THE INVENTION

The present invention provides a rack for receiving a memory storage device carrier. The rack functions as a conduit so that air can efficiently be directed through the rack to cool the memory storage device carrier.

According to one embodiment of the invention, the rack has a first lateral rail, a second lateral rail and a backplane with a connector. The connector of the rack couples with the connector of a memory storage device carrier. The "term" rack is broadly understood to include racks that are integrated within a memory storage device housing, removable racks, and externally mounted racks. Accordingly, it can be appreciated that the rack can assume any of a number of configurations. The first lateral rail and a second lateral rail extend perpendicularly from the backplane, and at least one lateral rail has a periphery defining an opening. A fan is mounted with respect to the opening to blow air through the opening.

According to an alternate embodiment of the invention, the backplane of the rack has a vent, and the first lateral rail defines a conduit between the vent and the opening to direct air out of the backplane. A fan is mounted on the lateral rail for directing air through the conduit and out of the vent of the backplane.

According to a further embodiment, the first lateral rail of the rack is boxed shaped to form a conduit through the first lateral rail, so that air can be directed through the rack to cool the memory storage device.

According to another embodiment, the first lateral rail includes a seal mounted on the periphery for sealing the first lateral rail against the lateral side of the carrier. The seal can be a rigid seal, or a compliant seal. Preferably, the lateral rails of the rack fit tightly with the carrier to form a seal.

According to an alternative embodiment, the second lateral rail has a periphery defining an opening. A fan is mounted on the periphery of the second lateral rail for blowing air through the opening.

According to a further embodiment of the invention, the rack for receiving a memory storage device carrier includes a periphery defining an opening adjacent to the backplane.

According to a further embodiment of the invention, the rack for receiving a memory storage device carrier includes a backplane which has a vent in fluid communication with the opening in the lateral rail to direct air out of the backplane. A fan is mounted on the backplane to direct air out through the opening.

According to an alternative embodiment of the invention, a memory storage device docking adapter includes a carrier for holding a hard disk drive. The carrier has a face with a vent, a first lateral side and a second lateral side extending perpendicularly from the face. The first lateral side of the carrier has a periphery defining an opening. The rack is configured to slidably engage the first and second lateral rails of the carrier. A fan is mounted with respect to the opening to blow air through the opening of the carrier.

The present invention provides a rack which has improved airflow to effectively cool a memory storage device and hard drive.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION

Figure 1:
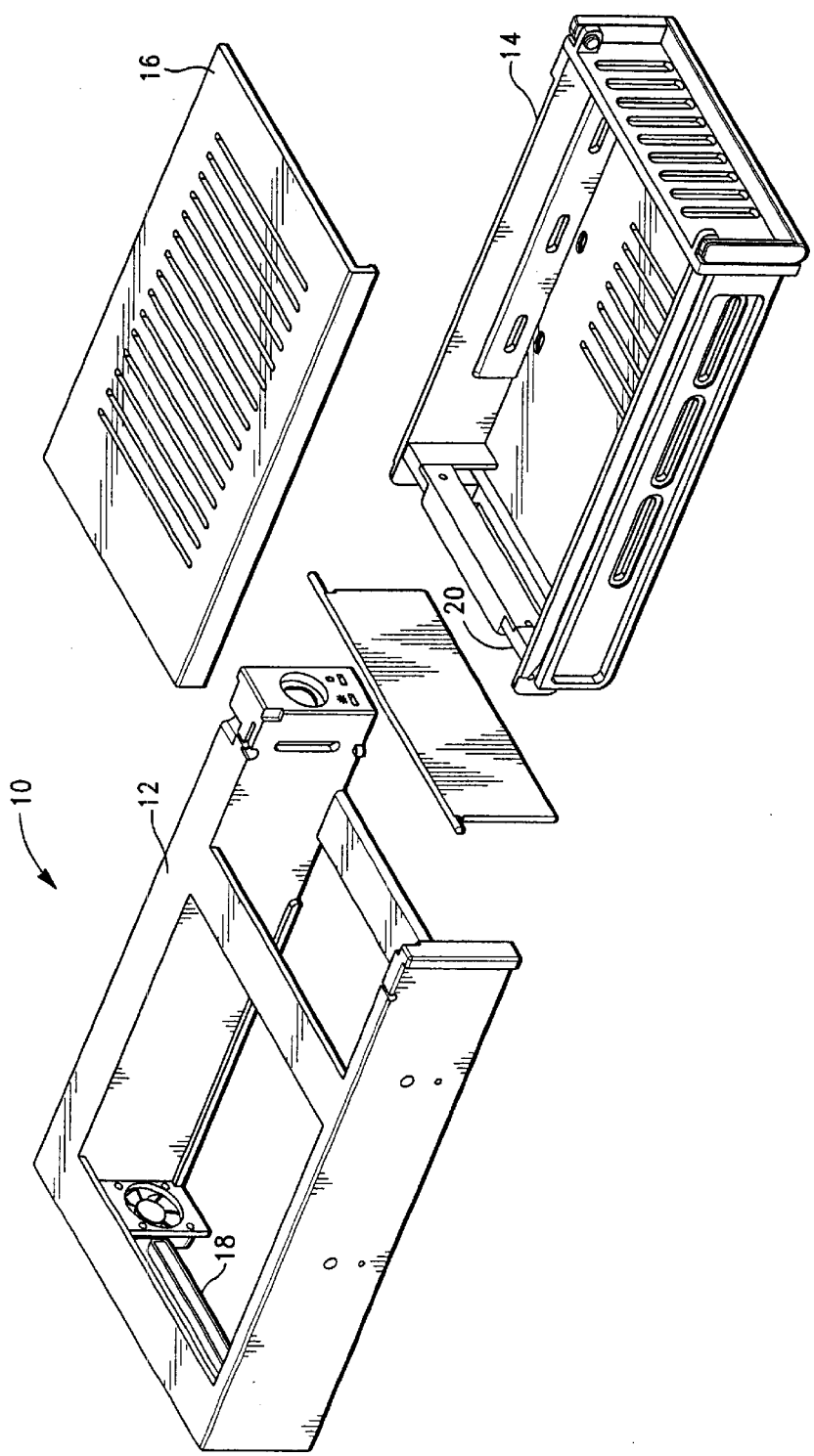
FIG. 1 shows a known docking adapter.
Figure 2:
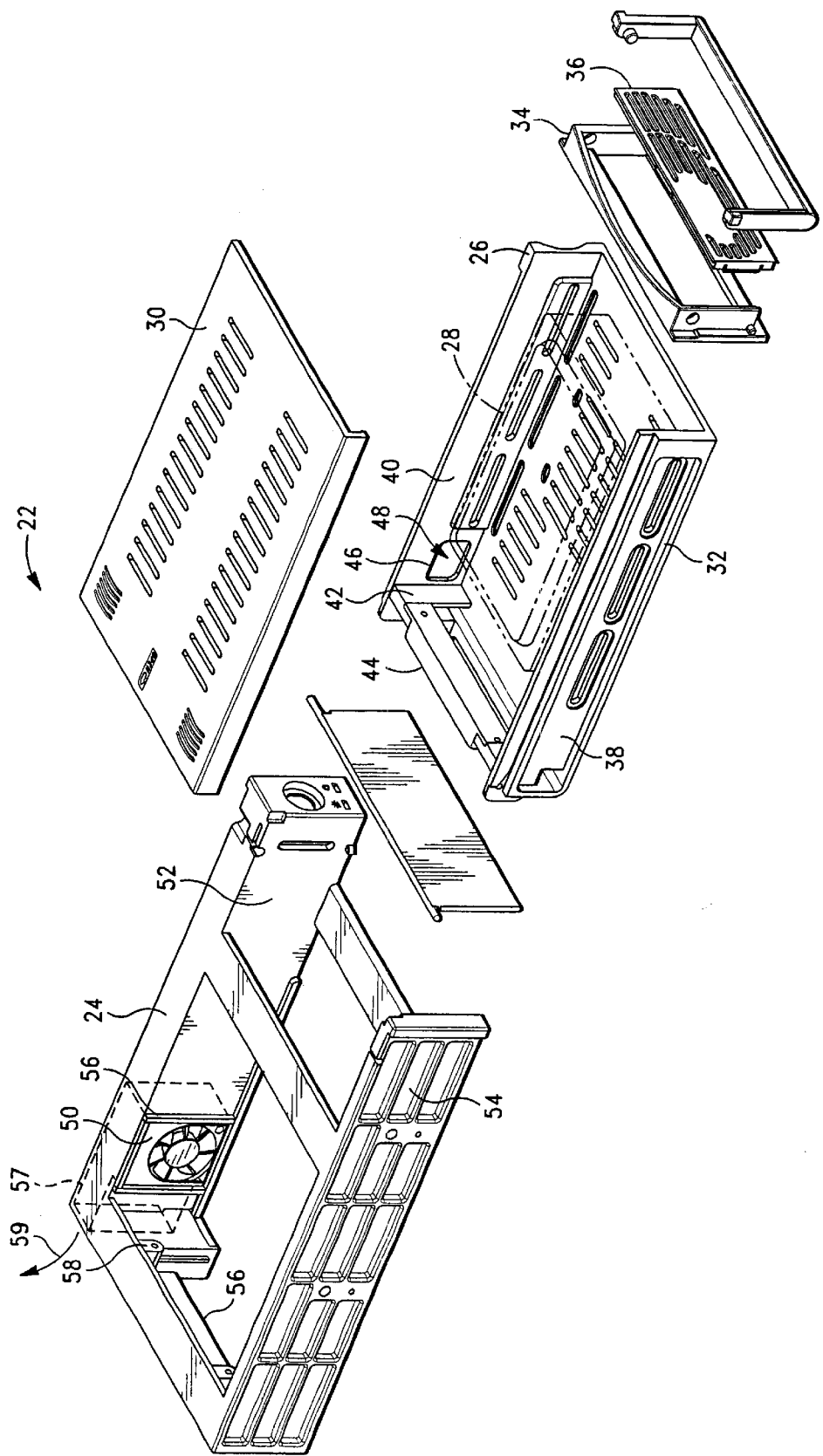
FIG. 2 shows an exploded perspective view of a rack and carrier in accordance with the present invention.

FIG. 2 shows a docking adapter for memory storage devices, generally designated with the reference numeral 22. The docking adapter 22 includes a rack 24 and a carrier 26. The carrier 26 holds a hard disk drive 28. Typically, the rack 24 mounts in the bay of microcomputer, or of a memory storage device housing. It can be appreciated, however, that the present invention can be employed in conjunction with an externally mounted hard drive. Additionally, while the docking adapter 22 is shown removably docking the hard disk drive 28, the present invention is not limited to use with only hard disk drives. Optical drives and other heat-generating media can be removably docked in accordance with the present invention.

The carrier 26 shrouds the hard disk drive 28 to protect the hard disk drive 28 and related components from impact during handling and transport. The carrier 26 has a top cover 30, a tray 32, a face 34 and a vent 36. The carrier 26 includes a first lateral side 38 and a second lateral side 40 that extend perpendicularly from the face, defining portions of the tray 32. The carrier 26 includes a backplane 42 with a data connector 44. The lateral side 40 of the carrier 26 has a periphery 46. The periphery defines an opening 48. The periphery 46 is generally rectangular in shape to enable air to exit the tray 32 of the carrier 26 to cool the hard disk drive 28. However, the periphery can be any shape or form which will enable air to exit the tray 32 of the carrier 26 to cool the hard disk drive.

The rack 24 has a fan 50, a first lateral rail 52, a second lateral rail 54 and a backplane 56 with a data connector 58. The data connector 58 couples with the data connector 44 and the opening 48 aligns with the fan 50 when the carrier 26 inserts into the rack 24. Preferably, the lateral sides 38 and 40 of the carrier 26 slidably engage the lateral rails 54 and 52 of the rack 24, respectively, to enable the carrier 26 to slide into the rack 24.

Although a single fan 50 mounted on the first lateral rail 52 is shown, it can be appreciated that additional fans can mount on the rack 24. For example, a fan 50 can mount on the second lateral rail 54 in accordance with the invention to improve cooling of the hard disk drive 28. It can also be appreciated that the carrier may have additional openings to accommodate any additional rack-mounted fans.

The first lateral rail 52 includes a seal 56. According to one aspect, the fan 50 has a square periphery with four sides. The seal 56 surrounds the four sides of fan 50, sealing the first lateral rail 52 against the lateral side 40 of the carrier 26 when the carrier 26 inserts into the rack 24. The seal 56 is positioned adjacent the opening 48 to optimize airflow through the opening 48 when the carrier 26 inserts into the rack 24. It can be appreciated that although the seal 56 fully surrounds the fan 50, the seal 56 may alternatively surround only a portion of the fan 50. The seal 56 shape and configuration depend on the configuration of the carrier 26, the top cover 30, the backplane 58 and rail 52 of the rack 24.

It can be appreciated that the seal 56 may be rigid or compliant. According to one aspect of the invention, the seal 56 is compliant, being fabricated from rubber. It can also be appreciated that the seal may attach to the carrier 26 periphery 46, instead of attachment to the rack 24.

According to one aspect of the invention, the carrier side 40 and the rack rail 54 fit tightly to seal the fan 50 against the carrier side 40. The lateral rail 52 is box-shaped to form a conduit 57 through the lateral rail 52. The conduit enables the lateral rail 52 to direct air from the carrier 26 through the distal end of the rack 24, out past the rack backplane 58 in the direction of the arrow 59.

Preferably, the opening 48 is at least ¼ square inches in area to enable the airflow to be sufficient to cool the hard disk drive 28. More preferably, the opening 48 is between ¼ and 1 square inches in area to effectuate hard drive cooling.

Figure 3:
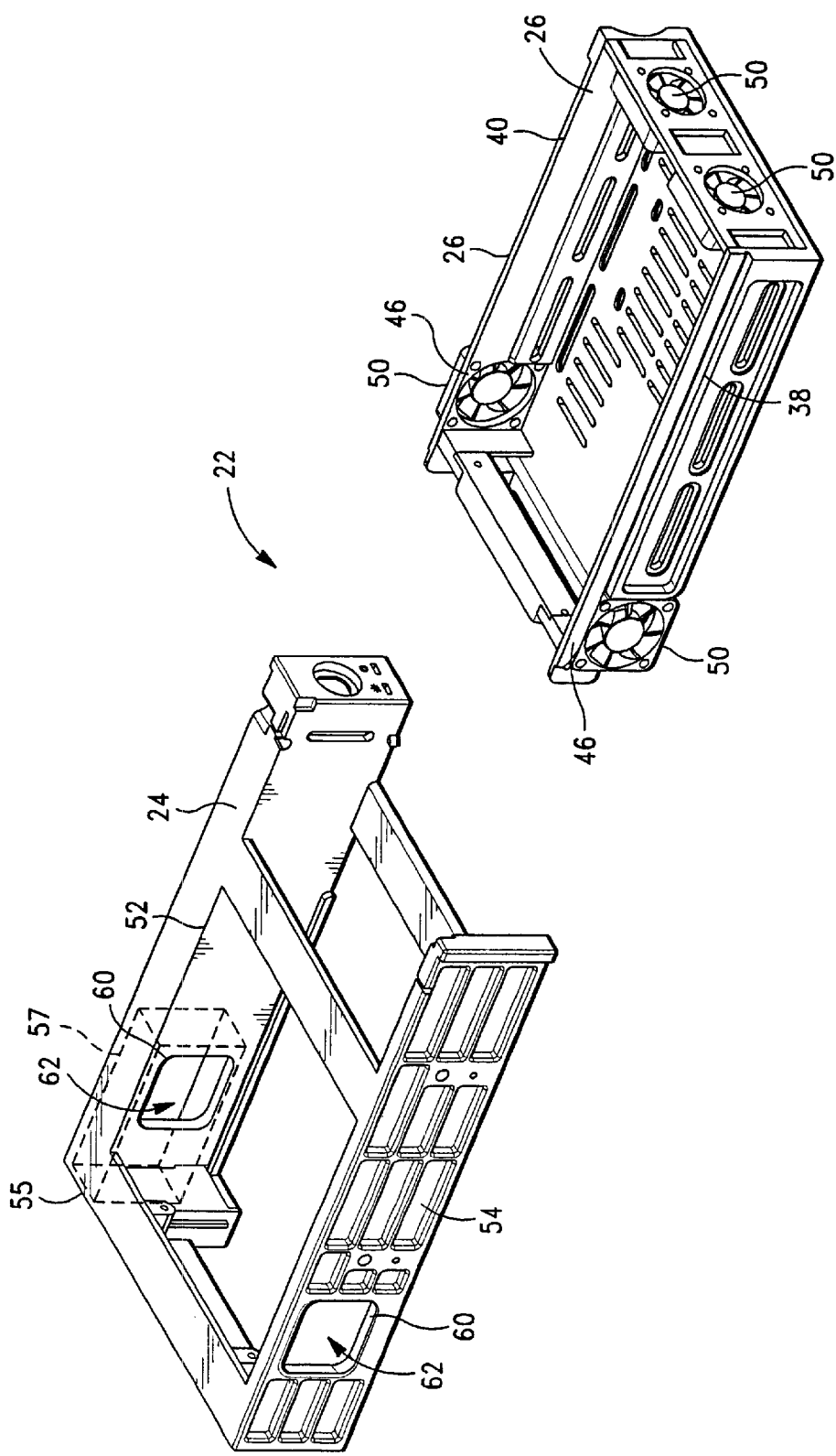
FIG. 3 shows an exploded perspective view of a rack and carrier in accordance with the present invention.

FIG. 3 shows the docking adapter 22 where the carrier 26 includes fans 50 mounted on the periphery 46 of the first lateral side 38 and the second lateral side 40 of the carrier 26. The rack 24 has a distal end 55.

The first rail 52 and the second rail 54 of the rack 24 each have a periphery 60 defining an opening 62. When the carrier 26 inserts into the rack 24, the carrier fans 50 of each lateral side 38 and 40 align, respectively, with the rack opening 62 to blow air from the carrier 26 through the rack opening 62. The rack opening 62 on the lateral rail 52 enables air to blow through the conduit 57, exiting from the distal end 55 of the rack 24. Preferably, each rack opening 62 is at least ¼ square inches in area to enable sufficient airflow to cool a carrier-mounted memory storage device. More preferably, each opening 62 is between ¼ and 1 square inches in area.

According to an alternate aspect of the invention, the carrier 26 has a single fan 50 mounted only to one lateral side 38 of the carrier 26.

Figure 4:
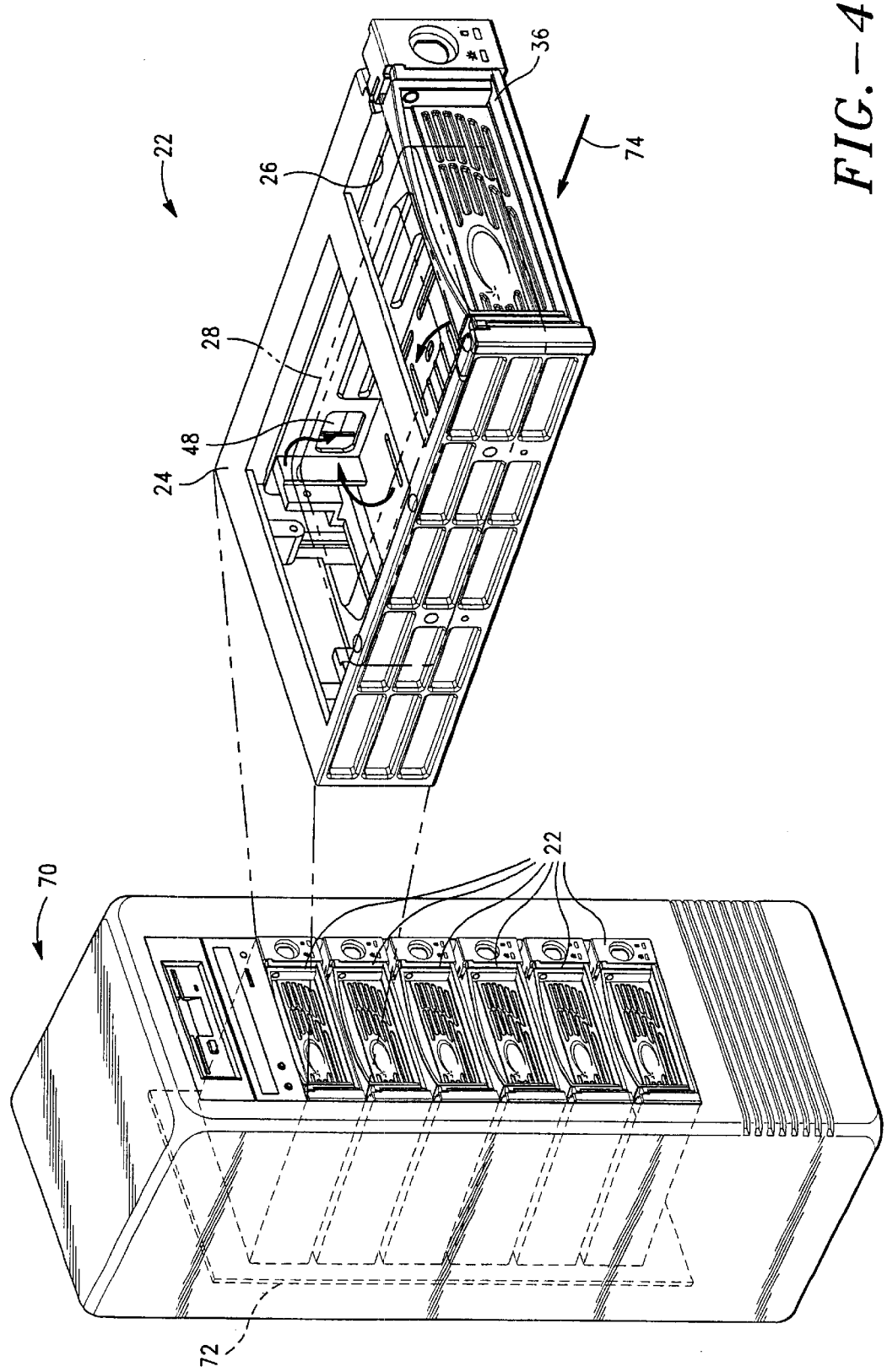
FIG. 4 shows a perspective view of a rack and carrier stacked in a memory storage device housing.

FIG. 4 shows a memory storage device housing, generally designated with the reference numeral 70. Multiple docking adapters 22 closely stack in the memory storage housing. The memory storage housing 70 includes a connector board 72 that electronically couples with each docking adapter 22.

The fan 50 draws air through the vent 36 in the direction of the arrows 74 to introduce cool air into the docking adapter 22. The air passes over and cools the hard disk drive 28. The fan 50 (hidden by the carrier 26) blows the air out from the carrier 26, though the opening 48.

The use of a laterally mounted fan 50 in a docking adapter 22 can be adapted to direct air laterally outward from the rack 24 instead of distally directing air. This would be useful in memory storage housings having a connector board which may interfere with distally directed airflow. It can be appreciated that additional fans 50 may be affixed to the rack 24, or the carrier 26. Also, the rack 24 may include a cover 30 with vents (FIG. 2), or without vents, so that the cover of the rack forms a conduit between the hard disk drive 28 and the cover 30.

Figure 5:
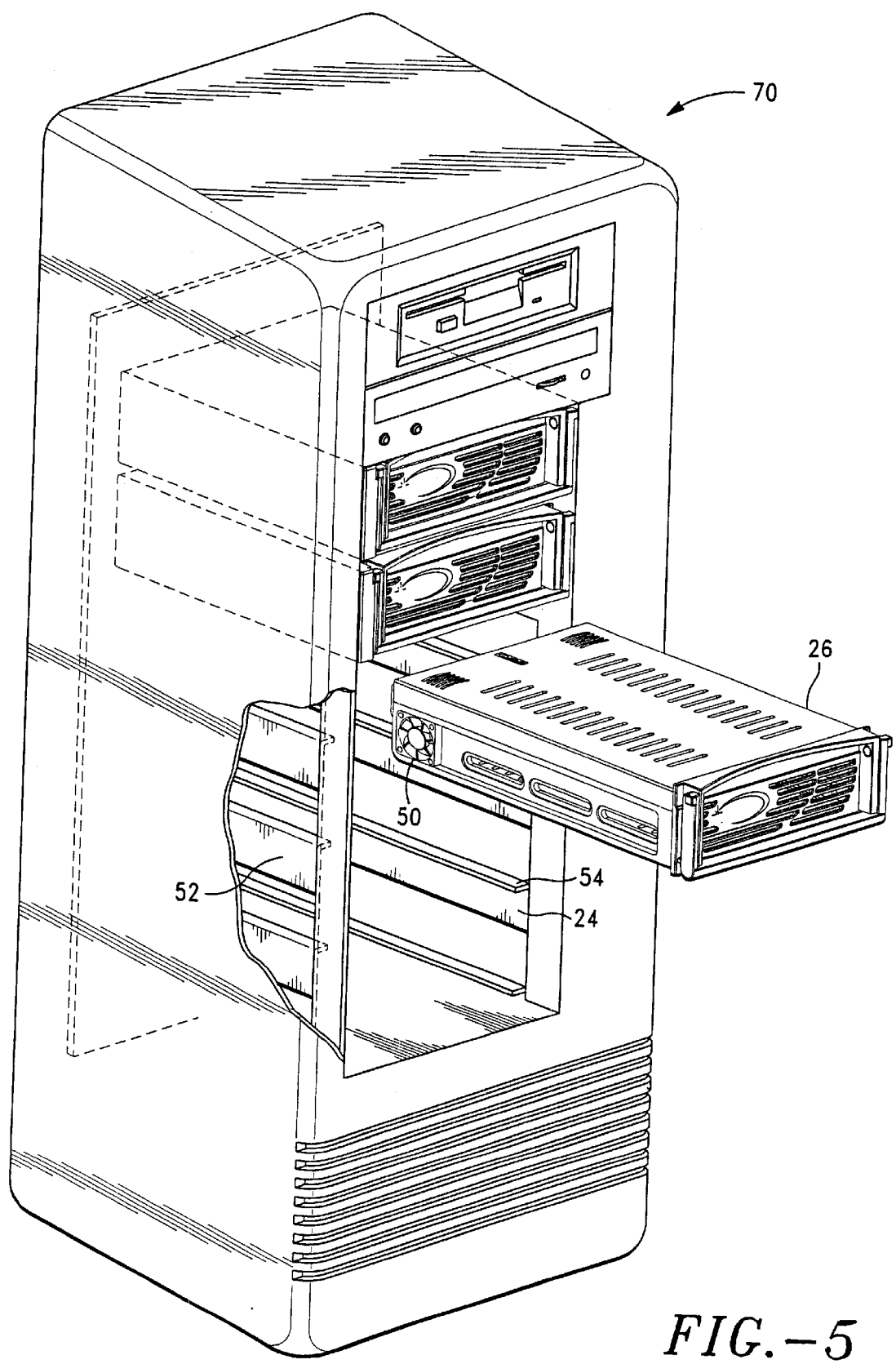
FIG. 5 shows a perspective view of a rack holding multiple carriers.

FIG. 5 shows a perspective view of a memory storage housing 70 having integrated racks 24. The integrated racks 24 include lateral rails 52 and 54 for sliding the carrier 26 into the memory storage housing 70. As shown, the carrier 26 has a laterally mounted fan 50. It can be appreciated, however, that the fan 50 may also be fixed on one or both of the lateral rails 52 and 54 to facilitate cooling.

While the invention has been described in detail with reference to the preferred embodiments thereof, it will be apparent to one skilled in the art that various changes and modifications can be made and equivalents employed, without departing from the present invention.

What is claimed is:

1. A rack for receiving a memory storage device carrier, the rack comprising:
    a backplane with a data connector, wherein the backplane has a vent, the first lateral rail defines a conduit between the vent and the opening to direct air out of the backplane;
    a first lateral rail and a second lateral rail extending perpendicularly from the backplane, at least one lateral rail having a periphery defining an opening; and a fan mounted with respect to the opening to blow air through the opening.

2. The rack as set forth in claim 1, wherein the first lateral rail is boxed shaped to form a conduit through the first lateral rail.

3. A rack for receiving a memory storage device carrier, the rack comprising:
- a backplane with a data connector;
- a first lateral rail and a second lateral rail extending perpendicularly from the backplane, at least one lateral rail having a periphery defining an opening;
- a fan mounted with respect to the opening to blow air through the opening; and
- comprising a seal mounted on the periphery for sealing the first lateral rail against the lateral side of the carrier.

4. The rack as set forth in claim 3, wherein the seal is rigid.

5. The rack as set forth in claim 3, wherein the seal is compliant.

6. A rack for receiving a memory storage device carrier, the rack comprising:
- a backplane with a data connector;
- a first lateral rail and a second lateral rail extending perpendicularly from the backplane, at least one lateral rail having a periphery defining an opening, wherein the first lateral rail and the second lateral rail are configured to slidably engage a first and a second lateral side of a carrier; and
- a fan mounted with respect to the opening to blow air through the opening.

7. A rack for receiving a memory storage device carrier, the rack comprising:
- a backplane with a data connector;
- a first lateral rail and a second lateral rail extending perpendicularly from the backplane;
- the rails being configured for holding a single memory storage device;
- a periphery defining an opening in the first lateral rail; and
- a fan mounted on the periphery for blowing air through the opening.

8. The rack as set forth in claim 7, wherein the backplane has a vent, the first lateral rail defines a conduit between the vent and the opening to direct air out of the backplane.

9. The rack as set forth in claim 7, wherein the first lateral rail is boxed shaped to form a conduit through the first lateral rail.

10. The rack as set forth in claim 7, further comprising a seal mounted on the periphery for sealing the first lateral rail against the lateral side of the carrier.

11. A rack for holding a memory storage device carrier, the rack comprising:
- a backplane;
- a pair of lateral rails mounted on the backplane for removably mounting a memory storage device;
- at least one lateral rail defining a conduit for venting air through the backplane; and
- a fan attached to at least one of the lateral rails for directing air through the conduit.

12. A rack for receiving a memory storage device carrier, the rack comprising:
- a backplane with a data connector, wherein the backplane has a vent in fluid communication with the opening in the lateral rail to direct air out of the backplane;
- a first lateral rail and a second lateral rail extending perpendicularly from the backplane, at least one lateral rail having a periphery defining an opening;
- a fan mounted with respect to the opening to blow air through the opening; and
- wherein the first lateral rail has a boxed shaped exterior.

13. A rack for receiving a memory storage device carrier, the rack comprising:
- a backplane with a data connector;
- a first lateral rail and a second lateral rail extending perpendicularly from the backplane, at least one lateral rail having a periphery defining an opening;
- a fan mounted with respect to the opening to blow air through the opening;
- wherein the first lateral rail has a boxed shaped exterior; and
- wherein the lateral rail has a vent in fluid communication with the opening in the lateral rail to direct air out of the lateral rail.

14. A rack for receiving a memory storage device carrier, the rack comprising:
- a backplane with a data connector;
- a first lateral rail and a second lateral rail extending perpendicularly from the backplane, at least one lateral rail having a periphery defining an opening;
- a fan mounted with respect to the opening to blow air through the opening;
- the first lateral rail is boxed shaped to form a conduit; and
- wherein the fan directs air out of the backplane through the conduit.

15. The rack as set forth in claim 14, wherein the conduit seals with the opening in the lateral rail.

16. The rack as set forth in claim 14, wherein the second rail is boxed shaped to form a conduit through the second rail.

17. A rack for receiving a memory storage device carrier, the rack comprising:
- a backplane with a data connector;
- a first lateral rail and a second lateral rail extending perpendicularly from the backplane; and
- at least one lateral rail having a periphery defining an opening for enabling a carrier with a laterally mounted fan located adjacent to the periphery to blow air through the opening.

18. The rack as set forth in claim 17, wherein the backplane has at least one vent in fluid communication with the opening in the lateral rail to direct air out of the backplane.

19. The rack as set forth in claim 17, wherein the first lateral rail forms a conduit.

20. The rack as set forth in claim 17, wherein the second lateral is boxed shaped to forms a conduit.

21. A rack for receiving a memory storage device carrier, the rack comprising:
- a backplane with a data connector;
- a first lateral rail and a second lateral rail extending perpendicularly from the backplane, at least one lateral rail having a periphery defining an opening;
- a fan mounted on the backplane; and
- wherein the backplane has a vent in fluid communication with the opening in the lateral rail to direct air out of the backplane.

22. The rack as set forth in claim 21, wherein the first lateral rail is boxed shaped to form a conduit through the first lateral rail.

23. The rack as set forth in claim 21, wherein the second lateral rail is boxed shaped to form a conduit through the second lateral rail.

24. A memory storage device docking adapter, comprising:
- a carrier for holding a hard disk drive, the carrier has a face with a vent, a first lateral side and a second lateral side extending perpendicularly from the face, and a backplane with a data connector, the first lateral side of the carrier has a periphery defining an opening;
- a rack having a first lateral rail, a second lateral rail and a distal end with a backplane attached to the lateral rails, the backplane includes a connector, the first and second lateral sides of the carrier are configured to slidably engage the first and second lateral rails, respectively, to insert the carrier into the rack; and
- a fan mounted with respect to the opening to blow air through the opening of the carrier.

25. The adapter as set forth in claim 24, wherein the first lateral rail is boxed shaped to form a conduit through the first lateral rail.

26. The adapter as set forth in claim 24, wherein the second lateral rail is boxed shaped to form a conduit through the second lateral rail.

27. The adapter as set forth in claim 24, wherein the backplane has a vent in fluid communication with the opening in the lateral rail to direct air out of the backplane.

28. The adapter as set forth in claim 24, wherein the fan is mounted on the backplane to draw air through the vent.

29. The adapter as set forth in claim 24, wherein the fan is mounted on the backplane to blow air through the lateral rail.

* * * * *